United States Patent
Singh et al.

(10) Patent No.: US 9,001,723 B1
(45) Date of Patent: Apr. 7, 2015

(54) METHOD AND SYSTEM FOR PROVIDING NOTIFICATIONS OF SYSTEM INFORMATION CHANGES ON A PER CYCLE BASIS

(75) Inventors: Jasinder P. Singh, Olathe, KS (US); Maulik K. Shah, Overland Park, KS (US); Deveshkumar Rai, Overland Park, KS (US); Sachin R. Vargantwar, Macon, GA (US)

(73) Assignee: Sprint Spectrum L.P., Overland Park, KS (US)

( * ) Notice: Subject to any disclaimer, the term of this patent is extended or adjusted under 35 U.S.C. 154(b) by 353 days.

(21) Appl. No.: 13/527,033

(22) Filed: Jun. 19, 2012

(51) Int. Cl.
*H04H 20/71* (2008.01)
*H04W 52/02* (2009.01)
*H04W 72/04* (2009.01)

(52) U.S. Cl.
CPC .......... *H04W 52/02* (2013.01); *H04W 72/0406* (2013.01)

(58) Field of Classification Search
CPC .... H04L 5/0053; H04W 48/10; H04W 48/12; H04W 52/02; H04W 52/0216; H04W 84/12; H04W 52/0229; H04W 84/18; H04W 72/0406
USPC ................ 370/312, 432, 311; 340/7.32–7.38; 455/343.1–343.6
See application file for complete search history.

(56) References Cited

U.S. PATENT DOCUMENTS

| | | | |
|---|---|---|---|
| 2002/0132585 A1* | 9/2002 | Palermo et al. | 455/41 |
| 2007/0287440 A1 | 12/2007 | Benkert et al. | |
| 2010/0267366 A1 | 10/2010 | Du | |
| 2011/0103288 A1* | 5/2011 | Lee et al. | 370/312 |
| 2011/0201380 A1 | 8/2011 | Iwamura et al. | |

OTHER PUBLICATIONS

A. Catovic et al., "Impact of SIB Scheduling on the Standby Battery Life of Mobile Devices in UMTS," On the Standby Battery Life of Mobile Devices in UMTS Networks, Jul. 2007.

* cited by examiner

*Primary Examiner* — Mang Yeung (57) ABSTRACT

A method and system for managing broadcast of notifications indicating whether system information has changed, so as to enable served devices to determine when to read and store updated system information. A radio access network tracks changes in system information on a per wakeup cycle basis, so as to determine whether system information has changed since a last instance of broadcasting such a notification in a particular wakeup cycle. If system information has changed, the network responsively broadcasts an indication that system information has changed, so as to cause devices operating on that wakeup cycle to read and store the updated system information. Whereas, if system information has not changed, the network responsively broadcasts an indication that system information has not changed (or forgoes broadcasting an indication that system information has changed), so that devices operating on that wakeup cycle can avoid reading and storing the system information.

18 Claims, 7 Drawing Sheets

| Time Unit | Tag Value | Wakeup Cycle | Reason for Tag Value |
|---|---|---|---|
| A | 0 | Cycle1 | |
| B | 0 | Cycle2 | |
| C | 0 | Cycle3 | |
| D | 0 | Cycle4 | |
| E | 0 | | |
| F | 0 | Cycle1 | System information changed since last tag value of this wakeup cycle |
| G | 0 | Cycle2 | System information changed since last tag value of this wakeup cycle |
| H | 1 | Cycle3 | System information changed since last tag value of this wakeup cycle |
| I | 1 | Cycle4 | System information changed since last tag value of this wakeup cycle |
| J | 1 | | |
| K | 1 | Cycle1 | System information changed since last tag value of this wakeup cycle |
| L | 1 | Cycle2 | System information changed since last tag value of this wakeup cycle |
| M | 1 | Cycle3 | System information changed since last tag value of this wakeup cycle |
| N | 1 | Cycle4 | System information changed since last tag value of this wakeup cycle |
| O | 1 | | |
| P | 1 | Cycle1 | System information changed since last tag value of this wakeup cycle |
| Q | 0 | Cycle2 | No change in system information since last tag value of this wakeup cycle |
| R | 0 | Cycle3 | No change in system information since last tag value of this wakeup cycle |
| S | 0 | Cycle4 | No change in system information since last tag value of this wakeup cycle |
| T | 0 | | |
| U | 0 | Cycle1 | No change in system information since last tag value of this wakeup cycle |

System Information Change ↑ (at F)
System Information Change ↑ (at K)

METHOD AND SYSTEM FOR PROVIDING NOTIFICATIONS OF SYSTEM INFORMATION CHANGES ON A PER CYCLE BASIS

BACKGROUND

A typical cellular wireless communication system provides numerous wireless coverage areas in which served wireless communication devices (WCDs) can operate. Each wireless coverage area is defined by radio frequency radiation from a respective cellular base station, and each base station, together with additional network infrastructure, may provide connectivity with one or more transport networks such as the public switched telephone network (PSTN) and the Internet. With this arrangement, a WCD that is positioned within a given wireless coverage area may be served by the base station defining that coverage area and may thereby engage in communication, via that base station and perhaps additional network infrastructure, with one or more other WCDs, network servers, and other entities.

In practice, a base station may radiate to define one or more wireless coverage areas and may periodically broadcast in each coverage area a set of system information for receipt and use by WCDs operating in the coverage. Such system information may take various forms. By way of example, the system information may include information that enables WCDs to operate in the coverage area, such as information about channel configuration and access parameters for instance. Further, the system information may include information that enables WCDs to evaluate and possibly hand off to other coverage areas, such as identifiers and operational parameters of neighboring coverage areas for instance.

From time to time, the system information that is periodically broadcast in a given coverage area or group of coverage areas may change, due to engineering input or dynamically according to a schedule or in response to evaluation of network conditions for instance. When that happens, it may be important for the WCDs operating in the coverage area to read the updated system information and update their settings accordingly. As WCDs are typically battery powered, however, it is impractical to have WCDs read the system information every time the base station broadcasts it. Consequently, many systems are instead (additionally) arranged to have each base station periodically broadcast a small "tag value" that may serve to indicate when the system information is changed, so as to trigger re-reading of the system information when appropriate.

In practice, for instance, the tag value may be a Boolean value, and the base station may be arranged to toggle the value between zero and one each time the system information changes. Alternatively, the tag value may be a binary word or byte (or the like), and the base station may be arranged to cycle through values of that binary word or byte, incrementing by one each time the system information changes. Once a WCD has read and stored the full set of system information broadcast in a coverage area, the WCD may then be arranged to periodically read just that tag value instead of the full set of system information. If and only if the WCD thereby determines that the tag value has changed, the WCD may then read the updated full set of system information. Thus, if the WCD does not detect that the tag value has changed, the WCD may forgo reading the full set of system information, thereby helping to conserve its battery power.

OVERVIEW

In some wireless communication systems, each WCD that is in an "idle" mode (not actively engage in a communication session) within a given coverage area may be arranged to operate in a low power "sleep" mode in order to conserve battery power, and to periodically wake up to read the tag value and other broadcast information and to take action, such as reading and storing the full set of system information, if appropriate. For instance, each WCD may be arranged to wake up every 1.28 seconds and to read the base station's next broadcast of the tag value so as to determine if the tag value has changed from the last time the WCD read it, and if so to then read the full set of system information.

Unfortunately, however, a problem can arise in this arrangement if the base station is set to broadcast the tag value sufficiently more often than the WCD is arranged to read the tag value. In particular, if the system information changes multiple times between times the WCD reads the tag value and the base station toggles or cycles through the tag value accordingly, it is possible that the tag value the WCD next reads may be identical to the tag value the WCD read the last time, even though the system information has changed since then.

By way of example, assume an idle WCD is arranged to wake up every 1.28 seconds to read the tag value but the base station is arranged to broadcast a one bit tag value every 80 milliseconds, i.e., 16 times per WCD wakeup cycle, and to toggle the bit value each time the system information changes. In this arrangement, if the system information changes more than once in the 1.28 second period between instances of the WCD waking up and reading the tag value, there is a risk that the WCD may see the same tag value the next time it wakes up and may therefore incorrectly conclude that the system information did not change and thus not read the system information.

For instance, if the tag value is zero the first time the WCD reads it and the system information changes twice before the next time the WCD reads the tag value, the tag value would change from zero to one and then back to zero by the time the WCD reads it again, and the WCD would thus see the same tag value and assume the system information did not change. Consequently, the WCD would not read the updated set of system information, which may lead to problems such as access failures, paging failures, and degraded user experience.

Likewise, if the tag value is a four bit word (having sixteen values) and the system information changes at least sixteen times between instances of the WCD waking up and reading the tag value, there is a risk that the WCD may similarly read the same tag value the next time it wakes up and incorrectly conclude that the system information did not change. For instance, if the system information changes sixteen times in that period, the tag value would cycle fully to the same value again, and the WCD would thus see the same tag value and assume that the system information did not change. Again in this scenario, the WCD would thus not read the updated set of system information, which may similarly lead to problems such as those noted above.

This issue becomes further complicated by the fact that, in many wireless communication systems, individual WCDs may operate on different or overlapping wakeup cycles. For instance, although all of the WCDs in a coverage area may operate on a 1.28 second wakeup cycle, those wakeup cycles may not be aligned in time. By way of example, there may be sixteen different 1.28 second cycles, each shifted by 80 milliseconds from the next (e.g., one starting at 0.00 seconds, the next starting at 0.08 seconds, the next starting at 0.16 seconds, and so forth), and the WCDs may be arranged to "hash onto" and use one of those cycles based on their WCD identifiers for instance. Alternatively or additionally, the wakeup cycles may differ length or in other ways from WCD to WCD.

In a coverage area supporting different wakeup cycles such as this, some WCDs may suffer from the problem noted above, while others may not. For instance, consider a scenario where a first $WCD_1$ wakes up and reads the tag value at 0.00 seconds and then again at 1.28 seconds, and where a second $WCD_2$ wakes up and reads the tag value at 0.08 seconds and then again at 1.36 seconds. Assume then that the tag value is one bit and that (i) the tag value is zero at 0 seconds, (ii) by 0.08 seconds, the system information changes once and thus tag value changes to one, (iii) by 1.28 seconds, the system information again changes once and thus the tag value changes back to zero, and (iv) the system information does not change again through 1.36 seconds, and thus the tag value remains zero. In this scenario, $WCD_1$ would see no change in the tag value between 0.00 seconds and 1.28 seconds, and would thus incorrectly assume that the system information had not changed and would thus not read the updated system information. On the other hand, $WCD_2$ would see a change in the tag value from one at 0.08 seconds to zero at 1.36 seconds and would thus properly read the updated system information.

Disclosed herein is are improved methods and corresponding systems or apparatuses for providing notifications of changes in system information, to help ensure that WCDs read updated system information when appropriate.

In one respect, for instance, disclosed is a method for managing broadcast of notifications indicating whether system information has changed, where a base stations provides the notifications over an air interface to WCDs, and where the air interface defines a plurality of slot cycles each respectively defining periodically recurring slots. The disclosed method may involve monitoring, separately for each slot cycle, variation in system information occurring between slots of the slot cycle, and broadcasting, respectively in a next slot of each slot cycle, an indication of whether system information has changed since a latest slot of the slot cycle, where the indication is based on the monitoring carried out separately for the slot cycle.

In another respect, disclosed is method for broadcasting tag values indicating whether system information has changed, where the broadcasting occurs over an air interface from a base station to WCDs, where the air interface defines a continuum of radio frames, each radio frame containing a tag value, where the WCDs are arranged to read the tag value from every Nth frame to determine whether system information has changed, and where N is greater than 1. The disclosed method may involve, for each of a plurality of radio frames of the continuum, (i) making a determination of whether system information has changed since N radio frames earlier in the continuum, (ii) if the determination is that system information has changed since N radio frames earlier in the continuum, then broadcasting in the radio frame a tag value indicating that system information has changed, and (iii) if the determination is that system information has not changed since N radio frames earlier in the continuum, then broadcasting in the radio frame a tag value indicating that system information has not changed.

In still another respect, disclosed is a base station for use in a cellular wireless communication system. The disclosed base station may comprise an antenna arrangement for radiating to define air interface over which to communicate to WCDs, where the air interface defines a continuum of radio frames, the WCDs are arranged to read a tag value from every Nth frame to determine whether system information has changed, and where N is greater than 1. Further, the base station may comprise a processing unit, data storage, and program instructions stored in the data storage and executable by the processing unit to carry out functions including (i) making a determination, for each of a plurality of radio frames of the continuum, of whether system information has changed since N radio frames earlier in the continuum, and (ii) in each radio frame of the plurality, setting the tag value based on the determination made for the radio frame.

These as well as other aspects, advantages, and alternatives will become apparent to those of ordinary skill in the art by reading the following detailed description, with reference where appropriate to the accompanying drawings. Further, it should be understood that this overview and the other description provided throughout this document is provided to explain the invention by way of example and is not intended to be limiting.

DETAILED DESCRIPTION

Referring to the drawings, as noted above, FIG. 1 is a simplified block diagram of a wireless communication system in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 1:
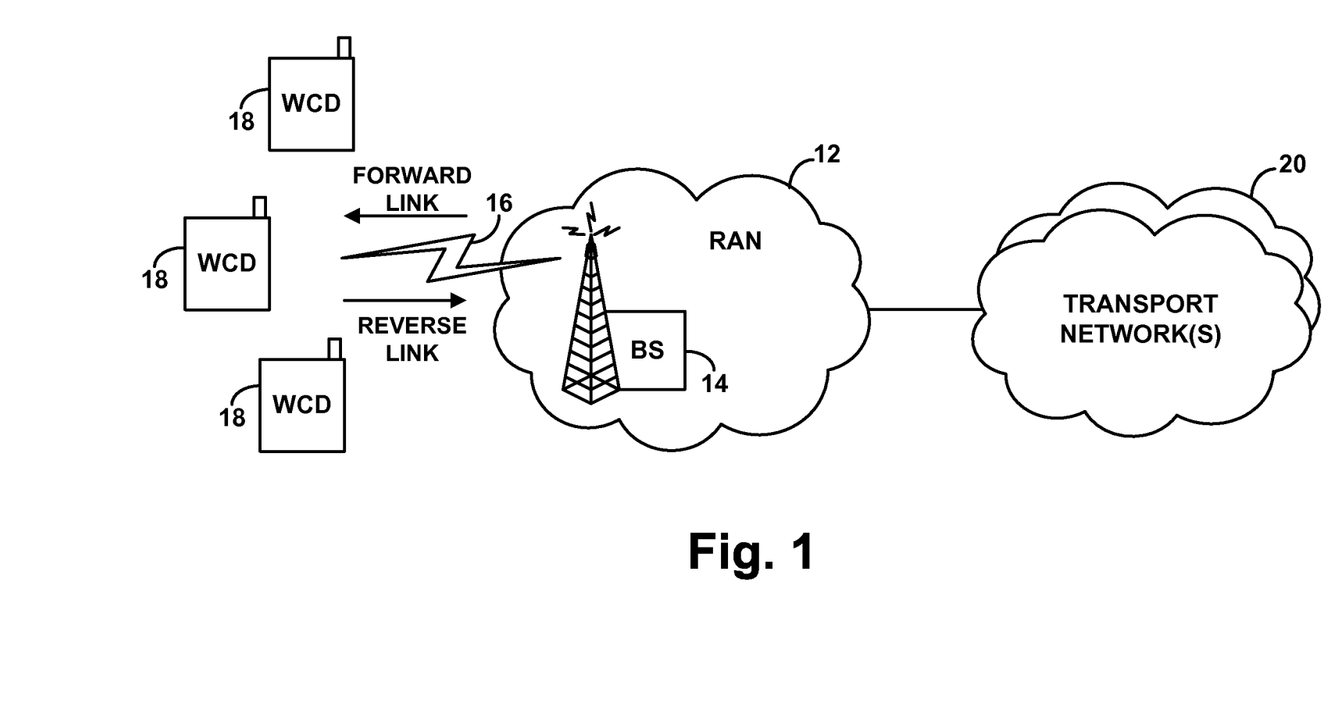
FIG. 1 is a simplified block diagram of a wireless communication system in which the present method can be implemented.

FIG. 1 depicts the example communication system as including at its core a RAN 12 having a base station 14 that radiates to define a wireless air interface 16 through which the base station may communicate with one or more served WCDs 18. RAN 12 then provides connectivity with one or more transport networks 20, such as the PSTN or the Internet for instance, thereby enabling suitably equipped WCDs to communicate with one or more other entities.

Figure 2:
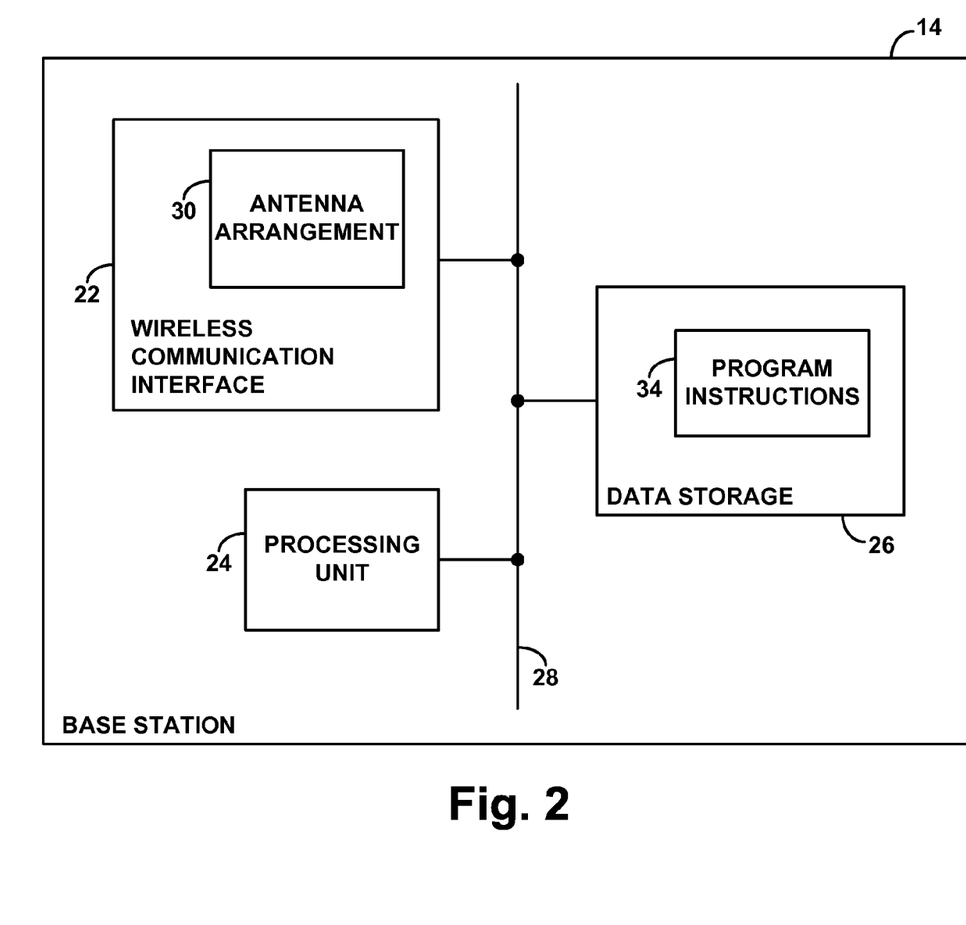
FIG. 2 is a is a simplified block diagram of a base station operable within the system.

FIG. 2 is next a simplified block diagram of a representative base station 14, such as a base transceiver station, access node, access point, Node-B, or eNodeB, for instance (whether macro, femto or the like), illustrating some of the components that can be included in such an entity. As shown in FIG. 2, the representative base station may include a wireless communication interface 22, a processing unit 24, and data storage 26, all of which may be coupled together by a system bus, network or other connection mechanism 28.

As shown, wireless communication interface 22 may comprise an antenna arrangement 30, which may be tower mounted, and associated components such as a cell site modem for engaging in air interface communication with WCDs 18, to facilitate transmission of data (e.g., control information and bearer traffic) to the WCDs and reception of data from the WCDs.

Processing unit 24 may then comprise one or more general purpose processors (e.g., microprocessors) and/or special-purpose processors (e.g., digital signal processors and/or application specific integrated circuits) and may be integrated in whole or in part with the wireless communication interface. And data storage 26 may comprise one or more volatile and/or non-volatile storage components and may be integrated in whole or in part with processing unit 24.

As shown, data storage 26 may hold program instructions 34, which may be executable by processing unit 24 to carry out various base station or RAN functions described herein. For instance, in accordance with the program instructions, processing unit 24 may function to cause base station 14 to periodically broadcast system information and a tag value indicating whether the system information has changed. Further, processing unit 24 may function to cause base station 14 to track system information changes separately and respectively for each of a plurality of wakeup cycles, so that each time the base station broadcasts a tag value in a given wakeup cycle, the base station would set that tag value to indicate whether system information has changed since a last wakeup instance of that particular cycle.

In practice, the processing unit 24 programmed with instructions 34 may define part or all of a controller for controlling operation of the base station 14. Alternatively or additionally, however, such control functionality could be provided external to the base station 14, in another RAN entity such as a radio network controller (RNC) or a base station controller (BSC), for instance, which could be communicatively linked with the base station and could serve to control aspects of base station operation and RAN operation generally.

Figure 3:
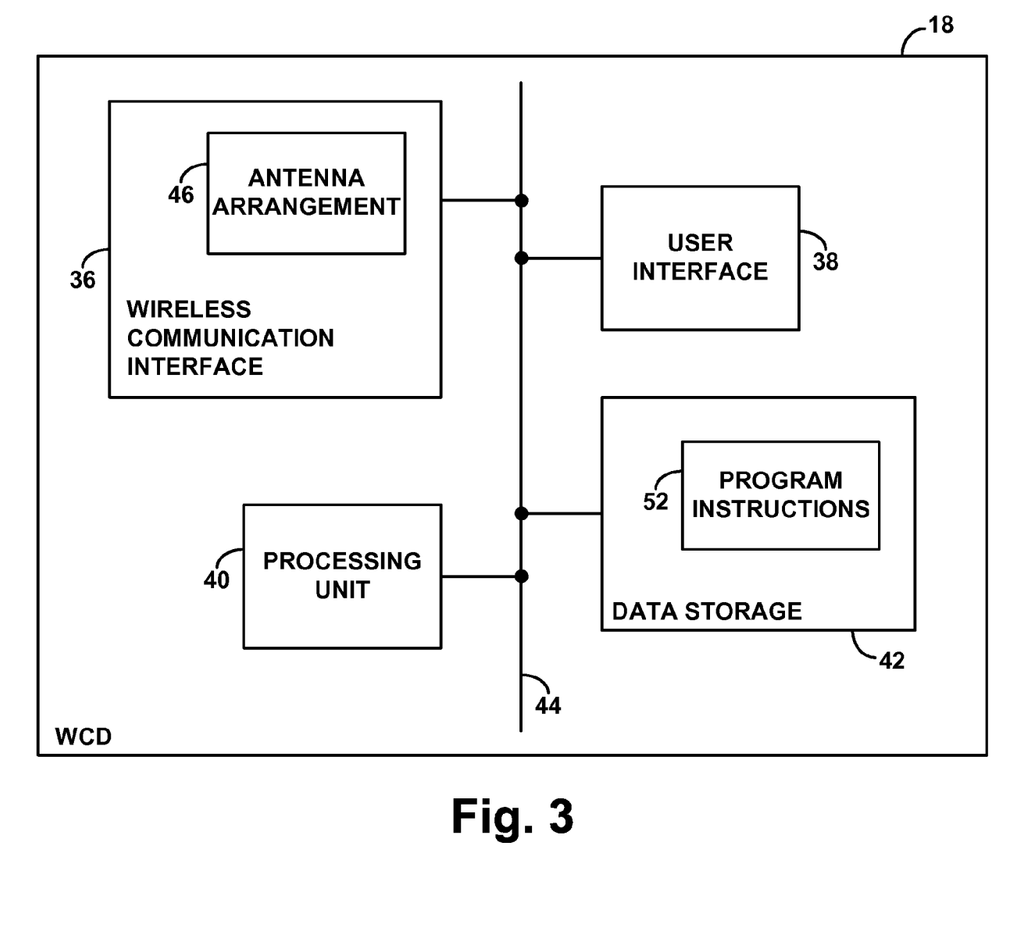
FIG. 3 is a simplified block diagram of a WCD operable to be served by the system.

FIG. 3 is next a simplified block diagram of a representative WCD 18 (also possibly referred to as user equipment, a mobile station, a wireless communication device, or the like), such as a cellular telephone, wirelessly equipped tablet or personal computer, embedded wireless communication module, for instance, illustrating some of the components that can be included in such a device. As shown, the representative WCD may include a wireless communication interface 36, a user interface 38, a processing unit 40, and data storage 42, all of which may be coupled together by a system bus, network, or other connection mechanism 44.

Wireless communication interface 36 may comprise an antenna arrangement 46 and associated components such as mobile station modem for instance, for engaging in communication with serving base stations such as base station 14, to facilitate transmission of data to the base stations and reception of data from the base stations. And user interface 38 may facilitate interaction with a user of the WCD if applicable, and may thus include output components such as a display screen, loudspeaker, and headphone jack, and input components such as a keypad, a touch-sensitive screen, and a camera.

Processing unit 40 may then comprise one or more general purpose processors and/or special-purpose processors and may be integrated in whole or in part with wireless communication interface 36. And data storage 42 may comprise one or more volatile and/or non-volatile storage components and may be integrated in whole or in part with processing unit 40.

As shown, data storage 42 may hold program instructions 52, which may be executable by processing unit 40 to carry out various WCD functions described herein. For instance, in accordance with the program instructions, processing unit 40 may function to cause WCD 18 to receive and store system information broadcast by base station 14. Further, processing unit 40 may function to cause WCD 18 to idle in a low-power "sleep" mode and to periodically wake up and read various information broadcast from base station 14, such as a tag value and, if the tag value indicates that system information has changed, the updated system information.

In practice, the RAN 12 and WCDs 18 may be arranged to communicate with each other over the air interface 16 according to one or more agreed air interface protocols, examples of which include Code Division Multiple Access (CDMA, e.g., 1xRTT or 1xEV-DO), Long Term Evolution (LTE), Wireless Interoperability for Microwave Access (WiMAX), IDEN, GSM, GPRS, UTMS, EDGE, MMDS, WIFI, BLUETOOTH, and other protocols now known or later developed.

As shown in FIG. 1, the air interface 16 defines a forward link (or "downlink") that carries wireless communications from the RAN to the WCDs and a reverse link (or "uplink") that carries wireless communications from the WCDs to the RAN. Depending on the protocol, these links may be structured in various ways. At a high level, for instance, the base station 14 may provide service on one or more frequency channels or bands, with forward-link communications occupying one band and reverse-link communications occupying another band. Alternatively, forward-link and reverse-link communications may be carried out on a common frequency band and may be differentiated through time division multiplexing and/or other techniques.

In accordance with the air interface protocol, the forward link may be divided over time into a continuum of units, such as timeslots or radio frames for instance, in which the base station may be arranged to transmit data. Further, each time unit of the continuum may be divided into smaller components, such as sub-slots or sub-frames, for carrying particular data as defined by the air interface protocol, and the time units themselves may be interleaved over time with other time units. The base station may then be arranged to broadcast a tag value and system information periodically in these time units, and WCDs may be arranged to correspondingly read the tag value and to thereby determine if the system information has changed and, if so, to then read and store the updated system information.

Figure 4:
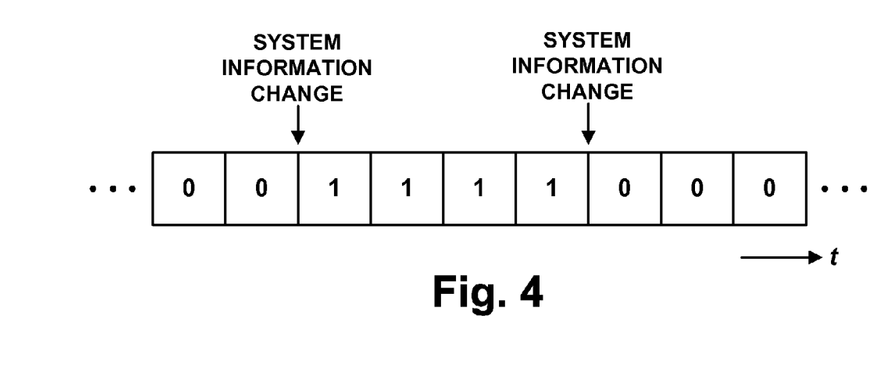
FIG. 4 is a simplified illustration of a continuum of time units containing tag values.

FIG. 4 is a simplified illustration of a portion of a representative forward link, depicting an example continuum of time units each containing, among other data such as system information (not shown), a Boolean tag value that the base station toggles each time system information changes. This example assumes that the base station broadcasts a tag value of zero in the first two time units as system information remains unchanged from one tag value broadcast to the next. In turn, the example assumes that the system information changes after the base station broadcasts the tag value in the second time unit, and so the base station toggles the tag value to one beginning in the third time unit. The example then assumes that the system information remains unchanged again for the next four tag value broadcasts, and so the tag value remains one through the sixth time unit. And the example then assumes that the system information again changes after the base station broadcasts the tag value in the sixth time unit, and so the base station toggles the tag value back to zero beginning in the seventh time unit. This process would continue as time goes on, with the base station toggling the tag value each time the system information changes.

If a WCD was arranged to read the tag value broadcast by the base station in every time unit, the WCD would be able to determine when the system information changed by detecting a change in the tag value (from zero to one, or from one to zero). Upon detecting that the tag value changed, the WCD could then responsively read and store the updated system information.

As discussed above, however, each WCD that is idling in the base station's coverage area may instead operate in a lower power sleep mode and may wake up periodically according to a wakeup cycle to read the tag value and other broadcast information. Consequently, a WCD may not read each of the tag values broadcast by the base station. A problem with this scenario, as discussed above, is that, if the system information changes more than once between instances that the WCD reads the tag value, the tag value that the WCD reads in one instance may appear unchanged from what the WCD read in the last instance, and the WCD may thus incorrectly assume that the system information did not change and may therefore not read and store the latest version of the system information.

Figure 5:
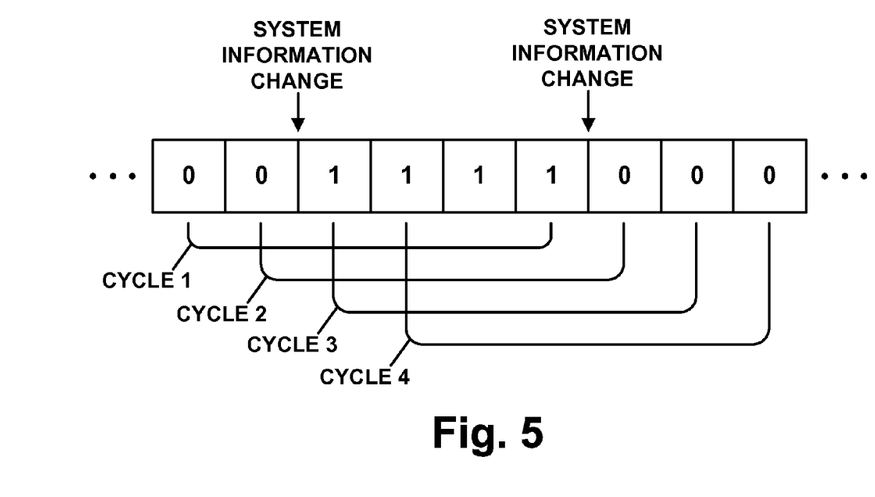
FIG. 5 illustrates wakeup cycles within the arrangement of FIG. 4.

FIG. 5 depicts how this problem may arise by way of example in the arrangement of FIG. 4. In particular, FIG. 5 assumes that WCDs operate with a wakeup cycle according to which they each wake up and read the tag value every five time units. Further, FIG. 5 depicts four examples of such wakeup cycles. According to cycle1, a WCD would read the tag value in the first time unit and then next in the sixth time unit; according to cycle2, a WCD would read the tag value in the second time unit and then next in the seventh time unit; according to cycle3, a WCD would read the tag value in the third time unit and then next in the eighth time unit; and according to cycle4, a WCD would read the tag value in the fourth time unit and then next in the ninth time unit. In practice, each WCD idling in the coverage of the base station may hash onto a particular one of these wakeup cycles, based on the WCD's identifier for instance. Thus, different WCDs may read different instances of the tag value.

As this arrangement shows, a WCD operating in accordance with cycle1 would read a tag value of zero in the first time unit and would then next read a tag value of one in the sixth time unit. The WCD would thus detect a change in the tag value and would responsively read and store the updated system information. Likewise, a WCD operating in accordance with cycle3 or cycle 4 would read a tag value of one and would then next read a tag value of zero and would thus similarly detect a change in the tag value and responsively read and store the updated system information.

Unfortunately, however, a WCD operating in accordance with cycle2 would read a tag value of zero in the second time unit and would then next read a tag value of zero again in the seventh time unit, even though the tag value changed twice in the interim. Detecting no change in the tag value, such a WCD would thus incorrectly assume that the system information did not change and would thus not read and store the updated system information, which may result in various problems as suggested above.

In accordance with the present method, one way to help overcome this problem is to have the base station maintain a record of changes in system information separately for each wakeup cycle (e.g., as the base station receives control signals providing or otherwise indicating changes to system information), and, when broadcasting a tag value for a given wakeup cycle, have the base station provide a tag value specific to that wakeup cycle, indicating whether the system information has changed since a last instance of the base station broadcasting the tag value for that wakeup cycle.

In practice, one way to do this is to store a Boolean flag separately for each wakeup cycle, clearing the flag (e.g., to a default value, such as zero) each time the base station broadcasts a tag value for that wakeup cycle, and setting the flag (e.g., to a value of one) if and only if the system information changes since a last instance of broadcasting the tag value for that wakeup cycle. For the next instance of broadcasting the tag value for that wakeup cycle, the base station may then broadcast a tag value based on the Boolean flag stored specifically for that wakeup cycle.

For example, if the Boolean value is still clear as of the next time unit of the wakeup cycle, the base station may respond to that Boolean value by broadcasting a tag value that the recipient WCD(s) would interpret as indicating that the system information has not changed (such as the clear Boolean value itself, or any value that is the same as the last tag value broadcast for that wakeup cycle), so that the WCD(s) would not go through the process of reading and storing the system information in response to the tag value. On the other hand if the Boolean value is set as of the next time unit of the wakeup cycle, the base station may respond to that Boolean value by broadcasting a tag value that the recipient WCD(s) would interpret as indicating that the system information has changed (such as the set Boolean value itself, or any value that is different than the last tag value broadcast for that wakeup cycle), so that the WCD(s) would responsively read and store the updated system information.

Another way to do this is to store, separately for each wakeup cycle, an indication of a version of the system information as of each time the base station broadcasts a tag value for the wakeup cycle, and, each time the base station is going to again broadcast a tag value for the wakeup cycle, to compare a current version of the system information with the version that the base station as of the last time the base station broadcast a tag value for the wakeup cycle. (In practice, a control signal providing the base station with new system information or otherwise indicating that system information has changed may indicate a corresponding version number of the system information. Alternatively, the base station may establish its own system of numbering versions of the system information as it changes.) Based on that comparison of system information versions, the base station may thereby determine what tag value to broadcast in a next time unit of that particular wakeup cycle.

For example, if the base station determines from the comparison that the system information has changed since the last time the base station broadcast a tag value for the wakeup cycle, the base station may then broadcast a tag value that the recipient WCD(s) would interpret as indicating that the system information has changed (such as a different tag value than the base station last broadcast for the wakeup cycle), to cause the WCD(s) to read and store the updated system information. On the other hand, if the base station thereby determines that the system information has not changed since the last time the base station broadcast a tag value for the wakeup cycle, the base station may then broadcast a tag value that the recipient WCD(s) would interpret as indicating that the system information has not changed (such as the same tag value that the base station last broadcast for the wakeup cycle), to cause the WCD(s) to not go through the process of reading and storing the system information. Other implementations are possible as well.

In practice, the base station may store a table, array, database, or other data structure specifying each wakeup cycle and providing per wakeup cycle the data that the base station will use as a basis to determine whether the system information has changed since the base station last broadcast a tag value for the wakeup cycle, so that the base station can determine accordingly what tag value to next broadcast for that wakeup cycle. For example, with the first implementation described above, the base station may store a table listing each wakeup cycle and specifying respectively for each wakeup cycle the Boolean value indicating whether the system information has changed since the base station last broadcast a tag value for the wakeup cycle. Similarly, with the second implementation described above, the base station may store a table listing each wakeup cycle and specifying respectively for each wakeup cycle the version of the system information as of the last time the base station broadcast a tag value for the wakeup cycle. The base station may then conveniently refer to the table to determine what tag value to next broadcast respectively for each wakeup cycle.

Still another way to do this, assuming all of the WCDs operate on the same length wakeup cycle but just shifted in time from one another, is to have the base station simply broadcast an indication of changed system information for the wakeup cycle duration each time the system information changes. For instance, if WCDs are arranged to wake up every five time units to read the tag value, the base station may respond to a change in system information by broadcasting in each of the next five time units a tag value that WCDs would interpret as indicating that the system information has changed, but otherwise to broadcast a tag value that WCDs would interpret as indicating that the system has not changed. That way, each time the system information changes, all WCDs that read the tag value in the next five time units, which should cover all of the wakeup cycles in this example, would determine that the system information has changed and would read the updated system information. On the other hand, if the system information has not changed, the WCD(s) would not see a tag value indicating that the system information has changed and would therefore not go through the process of reading and storing the system information.

Figure 6:
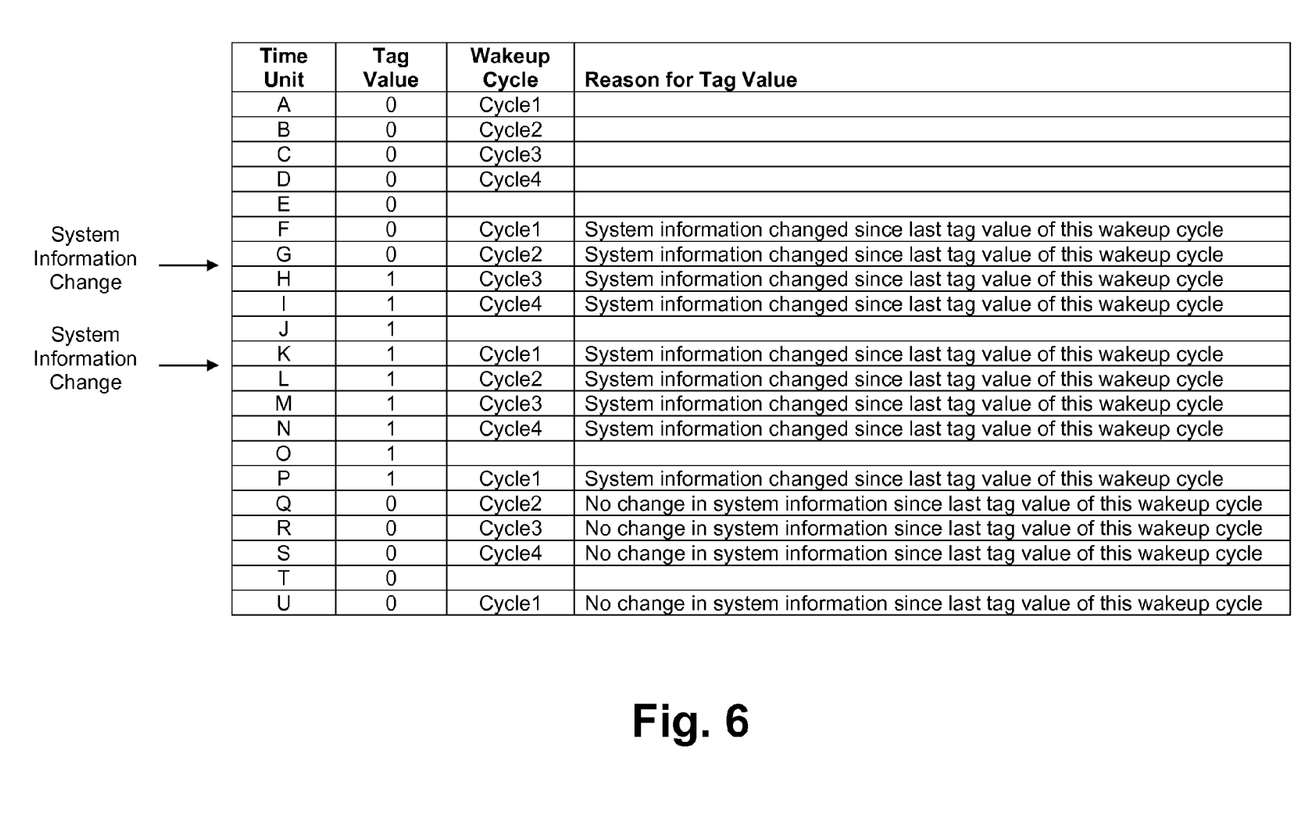
FIG. 6 is a table illustrating tag values that may result from application of the present method.

FIG. 6 illustrates how this process may play out with the slot cycles and system information changes shown in FIG. 5. In particular, FIG. 6 depicts a continuum of time units labeled A through U, each containing a tag value broadcast by the base station, where a tag value of zero indicates that the system information has not changed, and a tag value of one indicates that the system information has changed. FIG. 6 also depicts the system information changes as shown in FIG. 5.

As illustrated by FIG. 6, after the first depicted system information change following time unit G, the base station broadcasts in the next time units of cycle3 (H), cycle4 (I), cycle1 (K), and cycle2 (L) a tag value of one, because the system information has changed since a last instance of the base station broadcasting a tag value for each of those wakeup cycles. Similarly, after the second depicted system information change following time unit K, the base station broadcasts in the next time units of cycle2 (L), cycle3 (M), cycle4 (N), and cycle1 (P) a tag value of one, because the system information has changed since a last instance of the base station broadcasting a tag value for each of those wakeup cycles. In the last depicted time units of cycle2 (Q), cycle3 (R), cycle4 (S), and cycle1 (U), the base station broadcasts a tag value of zero once again, because the system information has not changed since a last instance of the base station broadcasting a tag value for each of those wakeup cycles.

The present method can be usefully implemented in connection with various air interface protocols.

By way of example, the method can be implemented in connection with LTE. According to a recent version of LTE, for instance, the forward link (downlink) defines a continuum of radio frames, each 10 milliseconds long, and each radio frame is divided into 10 sub-frames each 1 millisecond long. In practice, an LTE base station (eNodeB) may be arranged to broadcast in the fifth sub-frame of every eighth radio frame, i.e., at a period of every 80 milliseconds, a "system information block 1" (SIB1) that provides a tag value and that indicates where on the air interface the base station is providing a full copy of certain system information. Each WCD (user equipment (UE) device) served by the LTE base station may in turn operate on a wakeup cycle far longer than the 80 millisecond period at which the base station broadcasts the SIB1. For instance, each WCD may operate on a wakeup cycle of 1.28 seconds and may thus read every 16th tag value broadcast by the base station, i.e., in every 128th radio frame on the forward link. Further, various WCDs may operate on different wakeup cycles, which may be the same length as each other but may be shifted in time from each other, similar to the arrangement shown generally in FIG. 5.

Figure 7:
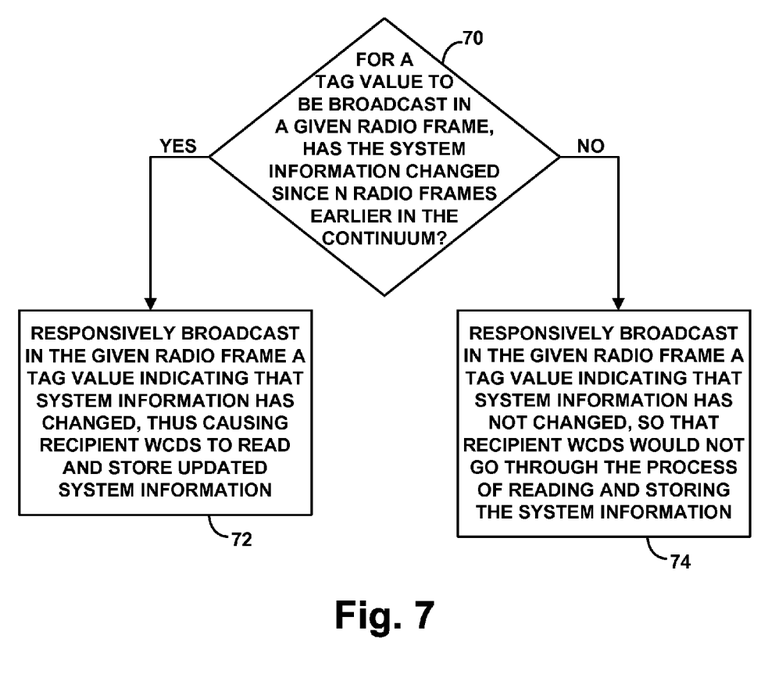
FIG. 7 is a flow chart depicting functions that can be carried out in accordance with the present method.

Applying the method in such an arrangement for instance, the base station may conveniently track changes in system information on a per-wakeup-cycle basis and provide tag values accordingly, as illustrated by the flow chart of FIG. 7. In particular, if we assume WCDs are arranged to read the tag value every N radio frames (e.g., every 16 radio frames of the radio frames in which the base station broadcasts the tag value, or every 128 radio frames in total), then for a tag value to be broadcast in a given radio frame, at block 70, the base station may determine whether the system information has changed since N radio frames earlier in the continuum.

If the base station thereby determines that the system information has changed since N radio frames earlier in the continuum, then at block 72, the base station may responsively broadcast in the given radio frame a tag value indicating that system information has changed (such as a tag value different than the tag value that the base station broadcast that number of radio frames earlier), thus causing recipient WCDs to read and store updated system information. On the other hand, if the base station thereby determines that the system information has not changed since N radio frames earlier in the continuum, then at block 74, the base station may responsively broadcast in the given radio frame a tag value indicating that system information has not changed (such as a tag value identical to the one that the base station broadcast that number of radio frames earlier), so that recipient WCDs would not go through the process of reading and storing the system information.

In line with the discussion above, for instance, the base station may maintain in data storage a flag that indicates whether system information has changed N radio frames earlier in the continuum and may set the flag if and only if system information changes since N radio frames earlier in the continuum. The base station may then provide a tag value based on that flag, such as the flag itself. Alternatively or additionally, the base station may track versions of the system information as discussed above, and for each radio frame in which the base station is going to broadcast a tag value, the base station may compare a current version of the system information with a version as of N radio frames earlier in the continuum to determine whether the system information has changed, and may broadcast a tag value accordingly.

Figure 8:
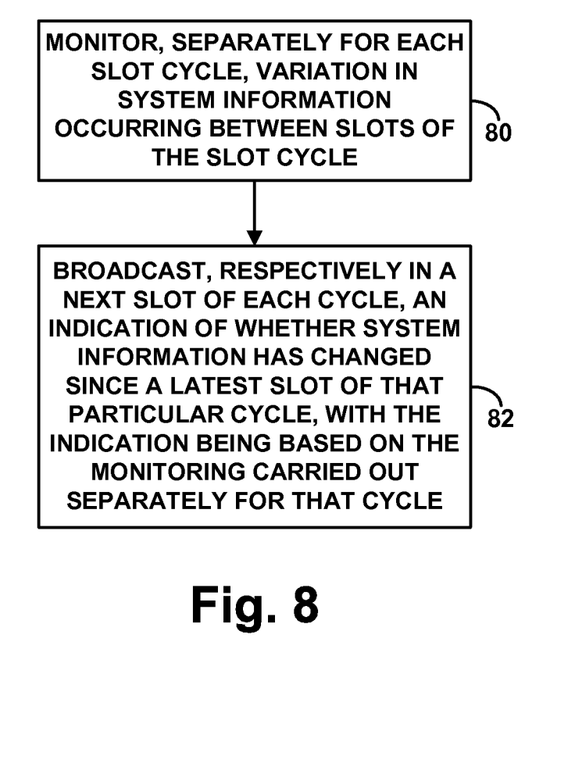
FIG. 8 is another flow chart depicting functions that can be carried out in accordance with the present method.

As another example, or phrased another way, the method can be implemented in connection with a protocol in which the air interface is time division multiplexed into a series of timeslots and the air interface defines multiple slot cycles each respectively defining periodically recurring slots, similar to the arrangement depicted in FIG. 5, with the slot cycles possibly being interleaved with each other. As illustrated by the flow chart of FIG. 8, the method in such an arrangement may involve monitoring, separately for each slot cycle, variation in system information occurring between slots of the slot cycle (i.e., between a broadcast instance in one slot of the slot cycle and a broadcast instance in a next slot of the slot cycle), at block 80. In turn, the method may then involve broadcasting, respectively in a next slot of each cycle, an indication of whether system information has changed since a latest slot of that particular cycle, with the indication being based on the monitoring carried out separately for that cycle, at block 82.

Again in practice, this implementation could involve, respectively for each slot cycle, maintaining in data storage a Boolean flag indicating whether system information has changed since the latest slot of the slot cycle, clearing the Boolean flag upon broadcasting the indication in the latest slot of the slot cycle, and then setting the flag if and only if the system information has changed since the latest slot of the slot cycle. The indication broadcast in the next slot of the cycle may then be based on that Boolean flag, such as being the Boolean flag itself.

Alternatively or additionally, the implementation could involve, respectively for each slot cycle, maintaining in data storage a first system information version (i.e., an indication of version of system information) as of the latest slot of the slot cycle, determining a second system version as of the next slot of the slot cycle, and determining based on a comparison of the first system information version and the second system information version, whether the system information has changed since the latest slot of the slot cycle.

Furthermore, in a scenario where the tag value being broadcast in a particular time unit indicates that system information has changed, the present method may involve broadcasting together with the tag value (e.g., as part of the tag value) an indication of which particular system information has changed, where the particular system information is a subset of a full set of system information. Advantageously, such an indication may allow recipient WCDs to then read and store just the changed system information rather than perhaps the full set of system information, thus further helping to conserve WCD battery power.

Exemplary embodiments have been described above. Those of ordinary skill in the art will appreciate, however, that numerous changes to the embodiments described can be made without deviating from the basic principles of the invention. For example, the method can be implemented in connection with other protocols. Further, although the above description focuses primarily on use of a one bit tag value, the method can just as well apply with more complex tag values or other indications of changes in system information. Other examples are possible as well.

We claim:

1. A method of managing broadcast of notifications indicating whether system information has changed, the notifications being provided over in a coverage area from a base station to wireless communication devices (WCDs), wherein the coverage area supports a plurality of different wakeup cycles each respectively defining periodically recurring time units, wherein the wakeup cycles are the same duration as each other but are not aligned in time with each other, the method comprising:

monitoring, separately for each wakeup cycle of the plurality of wakeup cycles that are the same duration as each other but are not aligned in time with each other, variation in system information occurring between time units of the wakeup cycle; and broadcasting, respectively in a next time unit of each wakeup cycle, an indication of whether system information has changed since a latest time unit of the wakeup cycle, wherein the indication is based on the monitoring carried out separately for the wakeup cycle.

2. The method of claim 1, wherein monitoring, separately for each wakeup cycle, variation in system information occurring between time units of the wakeup cycle comprises, respectively for each wakeup cycle:

maintaining in data storage a Boolean flag indicating whether system information has changed since the latest time unit of the wakeup cycle; and clearing the Boolean flag upon broadcasting the indication in the latest time unit of the wakeup cycle, and then setting the Boolean flag if and only if system information has changed since the latest time unit of the wakeup cycle.

3. The method of claim 2, wherein the indication broadcast in the next time unit of each wakeup cycle is based on the Boolean flag maintained for the wakeup cycle.

4. The method of claim 3, wherein the indication is the Boolean flag.

5. The method of claim 1, wherein monitoring, separately for each wakeup cycle, variation in system information occurring between time unit of the wakeup cycle comprises, respectively for each wakeup cycle:

maintaining in data storage a first system information version as of the latest time unit of the wakeup cycle;

determining a second system information version as of the next time unit of the wakeup cycle; and determining, based on a comparison of the first system information version and the second system information version, whether system information has changed since the latest time unit of the wakeup cycle.

6. The method of claim 1, wherein the wakeup cycles are interleaved with each other over time.

7. The method of claim 1, further comprising:

if the indication is that system information has changed since the latest time unit of the wakeup cycle, broadcasting with the indication a specification of which system information has changed.

8. A method for broadcasting tag values indicating whether system information has changed, the broadcasting occurring over an air interface from a base station to wireless communication devices (WCDs), the air interface defining a continuum of radio frames, each radio frame containing a tag value, wherein the WCDs are arranged to read the tag value from every 16th frame to determine whether system information has changed, the method comprising, for each of a plurality of radio frames of the continuum:

making a determination of whether system information has changed since 16 radio frames earlier in the continuum;

if the determination is that system information has changed since 16 radio frames earlier in the continuum, then broadcasting in the radio frame a tag value indicating that system information has changed; and if the determination is that system information has not changed since 16 radio frames earlier in the continuum, then broadcasting in the radio frame a tag value indicating that system information has not changed.

9. The method of claim 8, further comprising:
maintaining in data storage a record of a system information version per radio frame, respectively for each of at least the latest 16 radio frames,
wherein making the determination of whether system information has changed since 16 radio frames earlier in the continuum comprises comparing a current system information version with the system information version that the record indicates for 16 radio frames earlier in the continuum.

10. The method of claim 9, further comprising:
receiving into the base station a control signal indicating that system information has changed; and
updating the record based on the received control signal.

11. The method of claim 10, wherein the control signal indicates a corresponding system information version.

12. The method of claim 8, further comprising:
maintaining in data storage a flag indicating whether system information has changed since 16 radio frames earlier in the continuum; and
setting the flag if and only if system information changes since 16 radio frames earlier in the continuum,
wherein the tag value is based on the flag.

13. The method of claim 12, wherein the tag value is the flag.

14. A base station for use in a cellular wireless communication system, the base station comprising:
an antenna arrangement for radiating to define a coverage area in which to communicate to wireless communication devices (WCDs), the coverage area supporting a plurality of wakeup cycles each respectively defining periodically recurring time units, wherein the wakeup cycles are the same duration as each other but are not aligned in time with each other;
a processing unit;
data storage; and
program instructions stored in the data storage and executable by the processing unit to carry out functions comprising:
monitoring, separately for each wakeup cycle of the plurality of wakeup cycles that are the same duration as each other but are not aligned in time with each other, variation in system information occurring between time units of the wakeup cycle; and
broadcasting via the antenna arrangement, respectively in a next time unit of each wakeup cycle, an indication of whether system information has changed since a latest time unit of the wakeup cycle, wherein the indication is based on the monitoring carried out separately for the wakeup cycle.

15. The base station of claim 14, wherein monitoring, separately for each wakeup cycle, variation in system information occurring between time units of the wakeup cycle comprises:
for each wakeup cycle, comparing system information as of the next time unit with system information as of a latest time unit to determine whether a change in system information has occurred since the latest time unit.

16. The base station of claim 15, wherein the functions further comprise:
for each wakeup cycle, maintaining in the data storage a respective indication of system information version as of the latest time unit, to facilitate the comparing.

17. The base station of claim 14, wherein monitoring, separately for each wakeup cycle of the plurality of wakeup cycles that are the same duration as each other but are not aligned in time with each other, variation in system information occurring between time units of the wakeup cycle further comprises:
setting a flag indicative of the whether system information has changed since a latest time unit of the wakeup cycle.

18. The base station of claim 17, wherein broadcasting the indication of whether system information has changed based on the monitoring of each wakeup cycle comprises broadcasting the indication based on the flag.

* * * * *